United States Patent
Hohjoh et al.

(10) Patent No.: US 11,122,202 B2
(45) Date of Patent: Sep. 14, 2021

(54) IMAGING DEVICE, IMAGE PROCESSING SYSTEM, AND IMAGE PROCESSING METHOD

(71) Applicants: Daisuke Hohjoh, Chiba (JP); Ryoh Fukui, Kanagawa (JP)

(72) Inventors: Daisuke Hohjoh, Chiba (JP); Ryoh Fukui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/902,286

(22) Filed: Jun. 16, 2020

(65) Prior Publication Data

US 2020/0412948 A1    Dec. 31, 2020

(30) Foreign Application Priority Data

Jun. 27, 2019    (JP) .............................. JP2019-119671

(51) Int. Cl.
| | |
|---|---|
| *H04N 5/232* | (2006.01) |
| *H04N 5/247* | (2006.01) |
| *H04N 5/265* | (2006.01) |

(52) U.S. Cl.
CPC ......... *H04N 5/23238* (2013.01); *H04N 5/247* (2013.01); *H04N 5/265* (2013.01)

(58) Field of Classification Search
CPC ..... H04N 5/247; H04N 5/265; H04N 5/23238
See application file for complete search history.

(56) References Cited

U.S. PATENT DOCUMENTS

| | | | |
|---|---|---|---|
| 2005/0122400 A1* | 6/2005 | Kochi | G06T 5/006 348/207.99 |
| 2009/0160968 A1* | 6/2009 | Prentice | H04N 5/243 348/223.1 |
| 2011/0007132 A1* | 1/2011 | Redmann | H04N 13/133 348/42 |
| 2014/0232904 A1* | 8/2014 | Na | H04N 1/387 348/239 |
| 2015/0062363 A1 | 3/2015 | Takenaka et al. | |
| 2016/0050369 A1 | 2/2016 | Takenaka et al. | |
| 2016/0212336 A1 | 7/2016 | Takenaka et al. | |
| 2016/0234438 A1* | 8/2016 | Satoh | H04N 5/23245 |
| 2016/0269632 A1 | 9/2016 | Morioka | |
| 2017/0094169 A1* | 3/2017 | Yoshikawa | G06T 5/006 |
| 2020/0007756 A1* | 1/2020 | Tsuchiya | H04N 5/2352 |

FOREIGN PATENT DOCUMENTS

| | | |
|---|---|---|
| JP | 2015-226144 | 12/2015 |
| JP | 2016-171577 | 9/2016 |

\* cited by examiner

*Primary Examiner* — Peet Dhillon
(74) *Attorney, Agent, or Firm* — Xsensus LLP

(57) ABSTRACT

An imaging device includes a plurality of image sensors configured to capture a plurality of images, and processing circuitry. The processing circuitry is configured to determine whether a difference in brightness between the plurality of images exceeds a predetermined threshold. Based on a determination that the difference in brightness exceeds the predetermined threshold, the processing circuitry arranges the plurality of images side by side in one direction to be output as an output image.

16 Claims, 14 Drawing Sheets

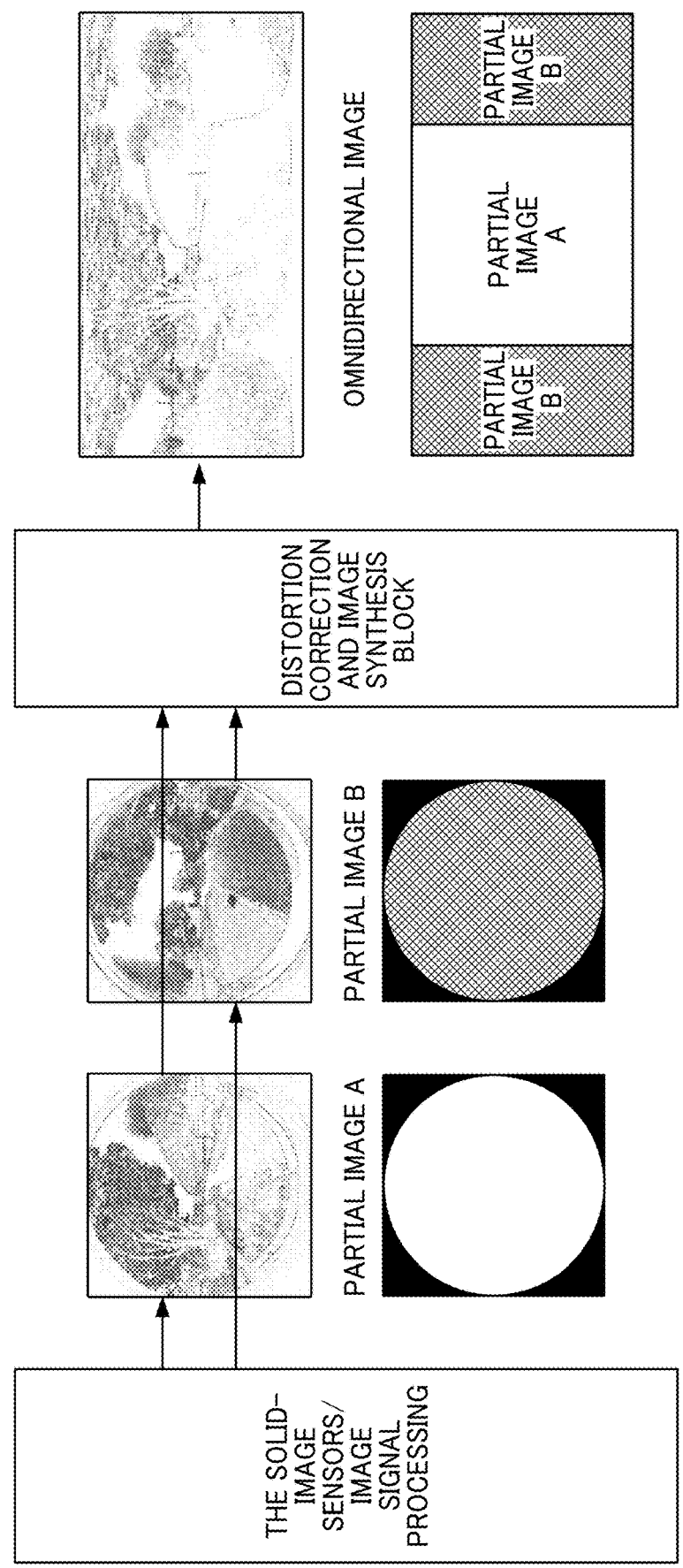

DIRECTION OF GRAVITY

CENTRAL AXIS

DIRECTION OF GRAVITY = CENTRAL AXIS

ROTATION CORRECTION

ROTATION (YAW) CORRECTION

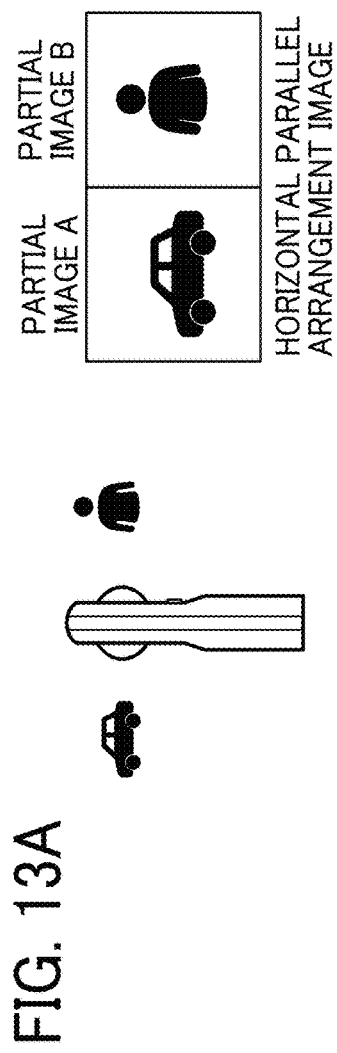
FIG. 13A
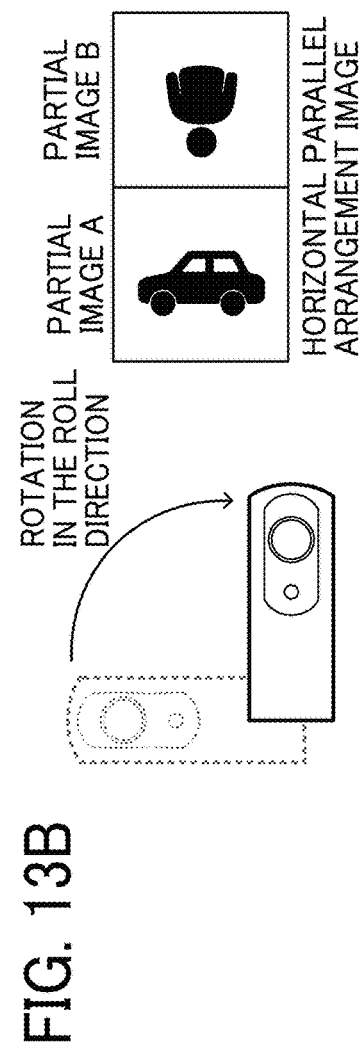
FIG. 13B
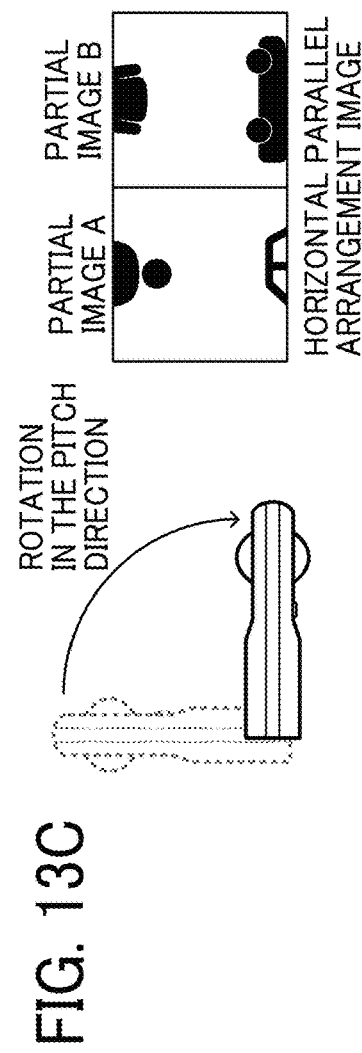
FIG. 13C
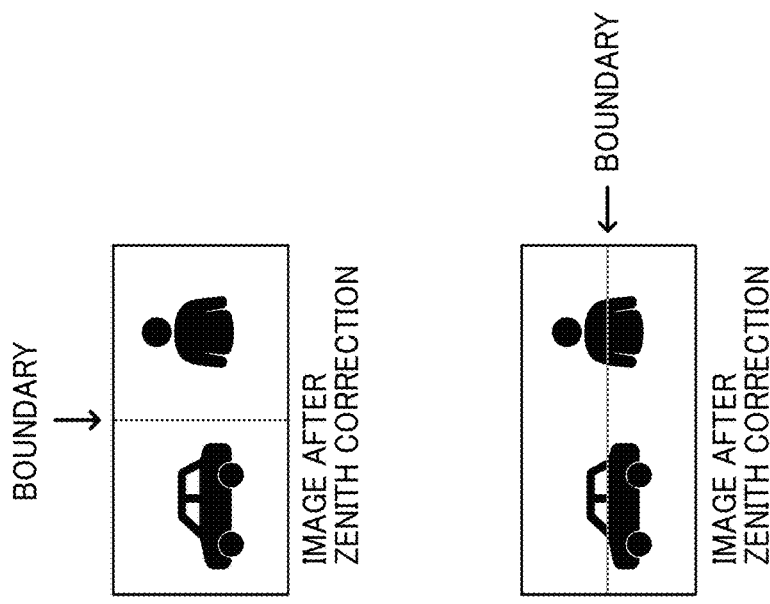

IMAGING DEVICE, IMAGE PROCESSING SYSTEM, AND IMAGE PROCESSING METHOD

CROSS-REFERENCE TO RELATED APPLICATIONS

This patent application is based on and claims priority pursuant to 35 U.S.C. § 119(a) to Japanese Patent Application No. 2019-119671, filed in Japan on Jun. 27, 2019, in the Japan Patent Office, the entire disclosure of which is hereby incorporated by reference herein.

BACKGROUND

Technical Field

Embodiments of the present application described herein provide an imaging device, an imaging processing system, and an image processing method.

Background Art

An omnidirectional imaging system that uses a plurality of wide-angle lenses such as fish-eye lenses and super-wide-angle lenses to create an omnidirectional image from a plurality of images is known. Hereinafter, such an omnidirectional image is referred to as a spherical image. However, since the plurality of images are taken by a plurality of lenses, the omnidirectional image looks unnatural depending on the subject taken by each lens and the surrounding conditions.

SUMMARY

In one aspect of this disclosure, there is provided an improved imaging device including a plurality of image sensors configured to capture a plurality of images, and processing circuitry. The processing circuitry is configured to determine whether a difference in brightness between the plurality of images exceeds a predetermined threshold. Based on a determination that the difference in brightness exceeds the predetermined threshold, the processing circuitry arranges the plurality of images side by side in one direction to be output as an output image.

In another aspect of this disclosure, there is provided an improved image processing system including processing circuitry configured to: acquire a plurality of images captured by a plurality of image sensors; determine whether a difference in brightness between the plurality of images exceeds a predetermined threshold; based on a determination that the difference in brightness exceeds the predetermined threshold, arrange the plurality of images side by side in one direction to generate an output image.

In still another aspect of this disclosure, there is provided an improved image processing method including: acquiring a plurality of images and determining whether a difference in brightness between the plurality of images exceeds a predetermined threshold. In a case that the determining determines that the difference in brightness exceeds the predetermined threshold, the method further includes arranging the plurality of images side by side in one direction to generate an output image.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 6A is a diagram of a data structure and data flow in a generation method for generating an omnidirectional image.

FIGS. 13A-13C illustrate orientations of an omnidirectional imaging device with respect to zenith correction of orientations of objects in captured omnidirectional images.

DETAILED DESCRIPTION

Figure 1:
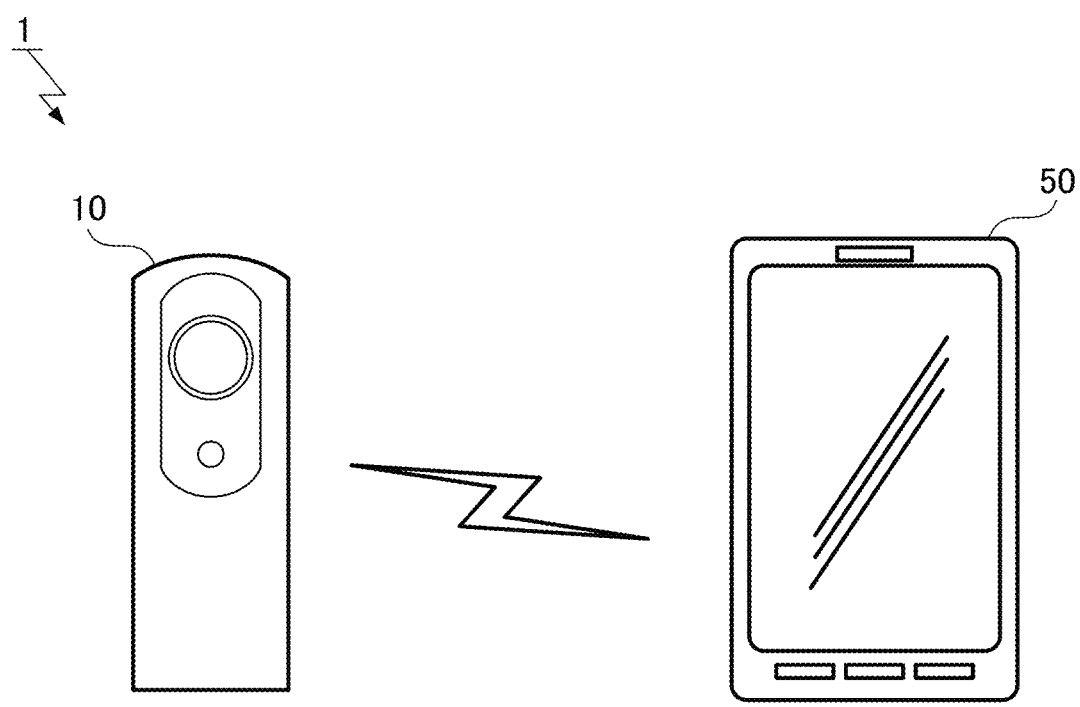
FIG. 1 is a diagram of an omnidirectional imaging system 1.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

Exemplary implementations of the present application are described below, but no limitation is indicated therein, and various applications and modifications may be made without departing from the scope of the application. In the implementations described below, as illustrated in FIG. 1, an omnidirectional imaging system 1 includes an omnidirectional imaging device 10 including two fisheye lenses and an information processing device 50 communicating with the omnidirectional imaging device 10.

Hereinafter, the schematic configuration of the omnidirectional imaging system 1 according to the present implementation is described with reference to FIG. 1 and FIG. 4. FIG. 1 is a diagram of the omnidirectional imaging system 1. The omnidirectional imaging system 1 includes the omnidirectional imaging device 10 and the information processing device 50. The omnidirectional imaging device 10 captures a plurality of images, such as wide-angle lens images, fish-eye lens images, and the like. The omnidirectional imaging device 10 is a device that captures images to generate an omnidirectional image centered on the omnidirectional imaging device 10.

The information processing device 50 is a terminal that communicates with the omnidirectional imaging device 10 and performs operations on the omnidirectional imaging device 10, reception of captured images, and the like. In FIG. 1, a smartphone terminal is shown as an example of the information processing device 50, but information processing device 50 is not particularly limited. Details of the omnidirectional imaging device 10 and the information processing device 50 will be described later.

Figure 2:
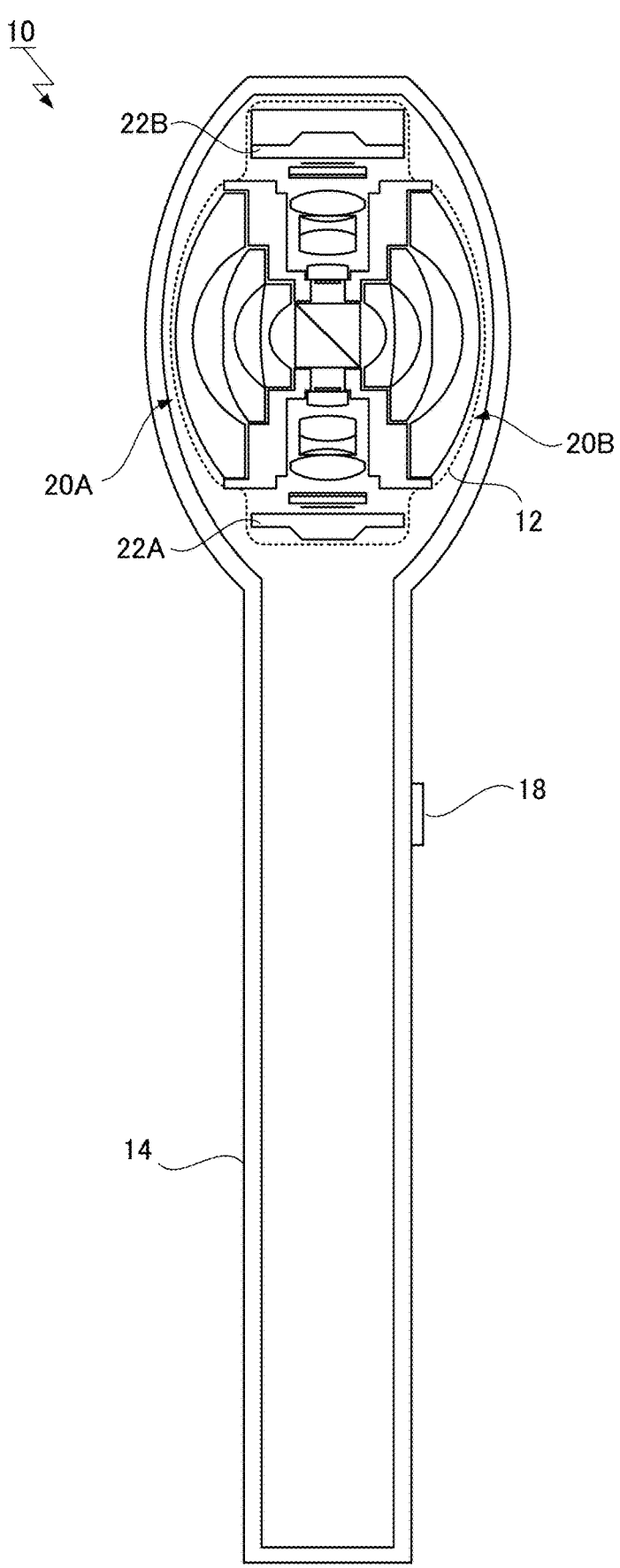
FIG. 2 is a sectional view of an omnidirectional imaging device 10.

FIG. 2 is a sectional view of the omnidirectional imaging device 10. The omnidirectional imaging device 10 illustrated in FIG. 2 includes an imaging body 12 and a housing 14 that holds the imaging body 12. The omnidirectional imaging device 10 may further include other components such as circuitry or processing circuitry (to be described below), a controller board, a battery, and a shutter button 18 that is provided on the housing 14.

The imaging body 12 illustrated in FIG. 2 includes two lens systems 20A and 20B and two solid-state image sensors 22A and 22B. Each of the solid-state image sensors 22A and 22B may be, for example, a charge-coupled device (CCD) sensor or a complementary metal oxide semiconductor (CMOS) sensor. The solid-state image sensors 22A and 22B are set so that the imaging surfaces are opposite to each other. For example, the two solid-state image sensors 22A and 22B are provided as a plurality of imaging units for the two lens systems 20A and 20B. However, the omnidirectional imaging device 10 of the present application is not limited to these. In other implementations, each different part of one solid-state image sensor may be used as an imaging unit, and an image may be formed on each part of one image sensor through the plurality of lens systems 20A and 20B. Each of the lens systems 20A and 20B may be configured as a fish-eye lens consisting of, for example, seven elements in six groups, fourteen elements in ten groups. In the omnidirectional imaging device 10 illustrated in FIG. 2, the above-mentioned fish-eye lens has a full angle of view of larger than 180 degrees (=360 degrees/n, where n denotes the number of optical systems and n is 2), and preferably has an angle of view of 190 degrees or larger. In the implementation to be described, two fisheye lenses having a total angle of view of more 180 degrees are used. However, it is not limited to these, but as long as a predetermined angle of view is obtained as a whole, three or more lens optical systems and image sensors may be used. Moreover, the omnidirectional imaging device 10 is not limited to fisheye lenses, and may include other types of lenses such as wide-angle lens or super-wide-angle lenses as long as a predetermined angle of view is obtained as a whole.

The relative positions of the optical elements (lenses, prisms, filters, and aperture stops) of lens system 20A and lens system 20B are determined with reference to the corresponding solid-state image sensor 22A and solid-state image sensor 22B. More specifically, positioning is made such that the optical axis of the optical elements of each of the lens system 20A and 20B is positioned at the central part of the light receiving area of a corresponding one of the solid-state image sensor 22A and 22B orthogonally to the light receiving area, and such that the light receiving area serves as the imaging plane of corresponding one of the fish-eye lenses. In order to reduce the parallax, folded optics may be adopted. Folded optics is a system in which light, converged by two lens systems 20A and 20B, can be divided to two image sensors by the two rectangular prisms. However, the present application is not limited to this configuration, and a three-fold refraction structure may be used in order to further reduce parallax, or a straight optical system may be used to reduce costs.

In the implementation illustrated in FIG. 2, the lens systems 20A and 20B have the same specifications and are oriented in directions reverse to each other such that the optical axes thereof coincide with each other. The solid-state image sensors 22A and 22B convert the light distribution of the received light into an image signal, and sequentially output image frames to the image processing block of the controller board. As will be described later in detail, the images captured by the respective solid-state image sensor 22A and 22B are combined so as to generate an image over a solid angle of 4π steradian (hereinafter, such an image is referred to as a "spherical image" or "omnidirectional image"). The spherical image is obtained by photographing multiple images, all the directions viewable from a photographing location and combining the photographed images. While it is assumed in the example implementation described below that a spherical image is to be generated, a so-called panoramic image obtained by photographing 360 degrees only in a horizontal plane or an image that is a part of the image obtained by photographing omnidirectionally or 360 degrees in a horizontal plane may also be generated. (For example, a full sky (dome) image taken 360 degrees horizontally and 90 degrees vertically from the horizon) The spherical image may be obtained as a still image or as moving images.

Figure 3:
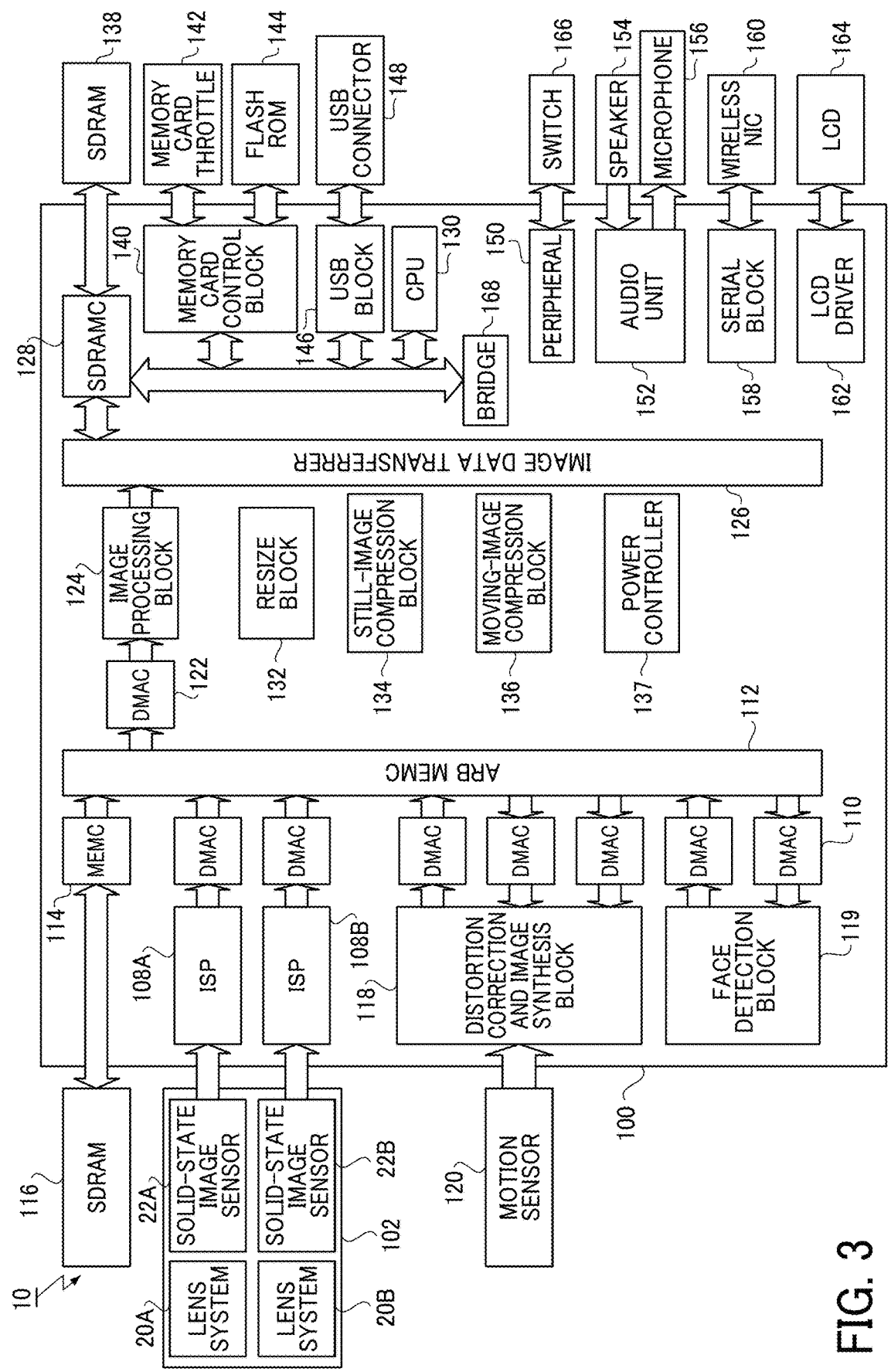
FIG. 3 is a block diagram of a hardware configuration of the omnidirectional imaging device 10.

FIG. 3 is a block diagram of the hardware configuration of the omnidirectional imaging device 10. The omnidirectional imaging device 10 comprises a digital still camera processor 100 (hereinafter, simply processor), a lens barrel unit 102, and various elements connected with the processor 100. The lens barrel unit 102 includes the two pairs of lens systems 20A, 20B and solid-state image sensors 22A, 22B. The solid-state image sensors 22A, 22B are controlled by a command from a central processing unit (CPU) 130 of the processor 100. The CPU 130 will be described later in detail. Moreover, processor 100 and CPU 130, either separately or together, may be referred to as circuitry processing circuitry.

The circuitry or processing circuitry may include general purpose processors, special purpose processors, integrated circuits, ASICs ("Application Specific Integrated Circuits"), conventional circuitry, CPUs, controllers, and/or combinations thereof which are configured or programmed to perform the disclosed functionality. Processors and controllers are considered processing circuitry or circuitry as they include transistors and other circuitry therein. In this disclosure, any circuitry, units, controllers, or means are hardware carry out or are programmed to perform the recited functionality. The hardware may be any hardware disclosed herein or otherwise known which is programmed or configured to carry out the recited functionality. When the hardware is a processor or controller which may be considered a type of circuitry, the circuitry, means, or units are hardware and/or the hardware and processor may be configured by executable instructions as described in this application.

The processor 100 includes Image Signal Processors (ISP) 108, Direct Memory Access Controllers (DMAC) 110, and an arbiter (ARBMEMC) 112 for arbitrating a memory access. In addition, the processor 100 includes a Memory Controller (MEMC) 114 for controlling the memory access, a distortion correction and image synthesis block 118, and a shooting mode switching unit 201. The ISPs 108A and 108B respectively performs Automatic Exposure (AE) control, Automatic white balance (AWB) setting, and gamma setting on images input through signal processing by the solid-state image sensors 22A and 22B. In FIG. 3, two ISPs 108A and 108B are provided corresponding to the two solid-state image sensors 22A and 22B. However, it is not limited to these, but one ISP may be provided for the two solid-state image sensors 22A and 22B.

The MEMC 114 is connected to an SDRAM 116 which temporarily stores data used in the processing of the ISP 108A, 108B and distortion correction and image synthesis block 118. The distortion correction and image synthesis block 118 performs distortion correction and vertical correction on the two partial images from the two pairs of the lens systems 20 and the solid-state image sensor 22 on the basis of information from a motion sensor 120 and synthesizes them. The motion sensor 120 may include a triaxial acceleration sensor, a triaxial angular velocity sensor, a geomagnetic sensor, and the like. A face detection block 119 performs face detection from the image and specifies the position of the person's face. In addition to the face detection block 119 or instead of the face detection block 119, an object recognition block for recognizing other subjects such as a full body image of a person, a face of an animal such as a cat or dog, a car or a flower may be provided.

The processor 100 further comprises a DMAC 122, an image processing block 124, a CPU 130, an image data transferrer 126, an SDRAMC 128, a memory card control block 140, a USB block 146, a peripheral block 150, an audio unit 152, a serial block 158, an LCD (Liquid Crystal Display) driver 162, and a bridge 168.

The CPU 130 controls the operations of the elements of the omnidirectional imaging device 10. At image processing block 124 performs various kinds of image processing on image data. The processor 100 comprises the resize block 132. The resize block 132 enlarges or shrinks the size of image data by interpolation. The processor 100 comprises a still-image compression block 134. The still-image compression block 134 is a codec block for compressing and expanding the still images such as those in JPEG/TIFF format. The still-image compression block 134 is used to store the image data of the generated spherical image, or to reproduce and output the stored image data. The processor 100 comprises a moving-image compression block 136. The moving-image compression block 136 is a codec block for compressing and expanding the moving images such as those in MPEG-4 AVC/H.264 format. The moving-image compression block 136 is used to store the video data of the generated spherical image, or to reproduce and output the stored video data. The processor 100 includes power controller 137.

The image data transferrer 126 transfers the images processed by the image processing block 124. The SDRAMC 128 controls the SDRAM 138 connected to the processor 100 and temporarily storing image data during image processing by the processor 100. The memory card control block 140 controls data read and write to a memory card and a flash ROM 144 inserted to a memory card throttle 142 in which a memory card is detachably inserted. The USB block 146 controls USB communication with an external device such as personal computer connected via a USB connector 148. The peripheral block 150 is connected to a power switch 166.

The audio unit 152 is connected to a microphone 156 for receiving an audio signal from a user and a speaker 154 for outputting the audio signal, to control audio input and output. The serial block 158 controls serial communication with the external device and is connected to a wireless NIC (network interface card) 160. The LCD driver 162 is a drive circuit for the LCD 164 and converts the image data to signals for displaying various kinds of information on an LCD 164. In addition to what is shown in FIG. 3, video interfaces such as HDMI (High-Definition Multimedia Interface) (registered trademark) are may be included and the like.

The flash ROM 144 stores a control program written in a code that can be decoded by the CPU 130 and various parameters. When a power supply is turned on by operating the power switch 166, the control program is loaded to a main memory, and the CPU 130 controls operations of the respective units of the device according to the program read into the main memory. Concurrently, the SDRAM 138 and a local SRAM (Static Random Access Memory) temporarily store data required for control. By using rewritable flash ROM 144, the control program and the parameter for control can be changed, and a version of the function can be easily updated.

Figure 4:
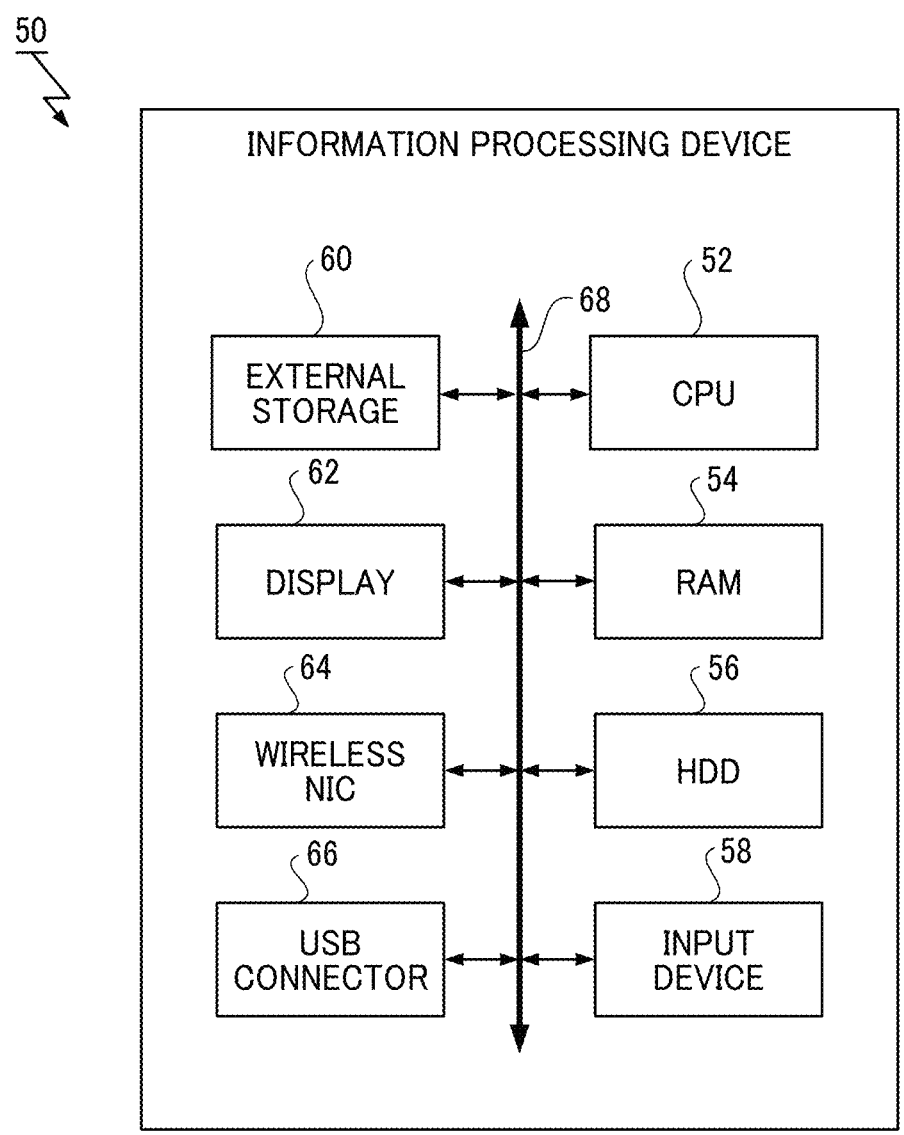
FIG. 4 is a block diagram of a hardware configuration of information processing device 50 of the omnidirectional imaging system 1.

FIG. 4 is a block diagram of a hardware configuration of the information processing device 50. In various implementations, the information processing device 50 may be a mobile device such as a smartphone and a tablet computer, a personal computer, a workstation, a server computer, a computer system, and the like. The information processing device 50 illustrated in FIG. 4 includes a CPU 52, a random access memory (RAM) 54, and hard disk drive (HDD) 56. The CPU 52 controls the operations of components of the information processing device 50, or controls the overall operations of the information processing device 50. Information processing device 50 may include circuitry or processing circuitry, such as CPU 52. The RAM 54 provides the work area of the CPU 52. The HDD 56 stores therein an operating system and a control program, such as an application, that executes processes in the information processing device 50 according to the present implementation, each of the operating system and the control program being written in a code decodable by the CPU 52. The information processing device 50 may include Solid State Drive (SSD) instead of HDD.

The information processing device 50 may include an input device 58, an external storage 60, a display 62, a wireless NIC 64, and a USB connector 66. The input devices 58 are input devices, such as a mouse, a keyboard, a touchpad, and a touchscreen, and provide a user interface. The external storage 60 is a removable recording medium mounted, for example, in a memory card slot, and records various types of data, such as image data in a video format and still image data.

The display 62 performs the display of an operation screen, the display of the monitor image of the image captured by the omnidirectional imaging device 10 that is ready to capture or is capturing an image, and the display of the stored video or still image for reproducing or viewing. The display 62 and the input device 58 enable, through the operation screen, making instructions for image capturing or changing various kinds of setting in the omnidirectional imaging device 10.

The wireless NIC 64 establishes a connection for wireless LAN communication with an external device such as the omnidirectional imaging device 10. The USB connector 66 provides a USB connection to an external device such as the omnidirectional imaging device 10. By way of example, the wireless NIC 64 and the USB connector 66 are described. However, limitation to any specific standard is not intended, and connection to an external device may be established through another wireless connection such as Bluetooth (registered trademark) and wireless USB or through a wired connection such as wired local area network (LAN).

When power is supplied to the information processing device 50 and the power thereof is turned on, the program is read from a ROM or the HDD 56, and loaded into the RAM 54. The CPU 52 follows the program read into the RAM 54 to control the operations of the parts of the device, and temporarily stores the data required for the control in the memory. This operation implements functional units and processes of the information processing device 50, as will be described later. As examples of the program include an application for giving various instructions to the connected the omnidirectional imaging device 10 and requesting an image through a bus 68.

<Entire Image Processing>

Figure 5:
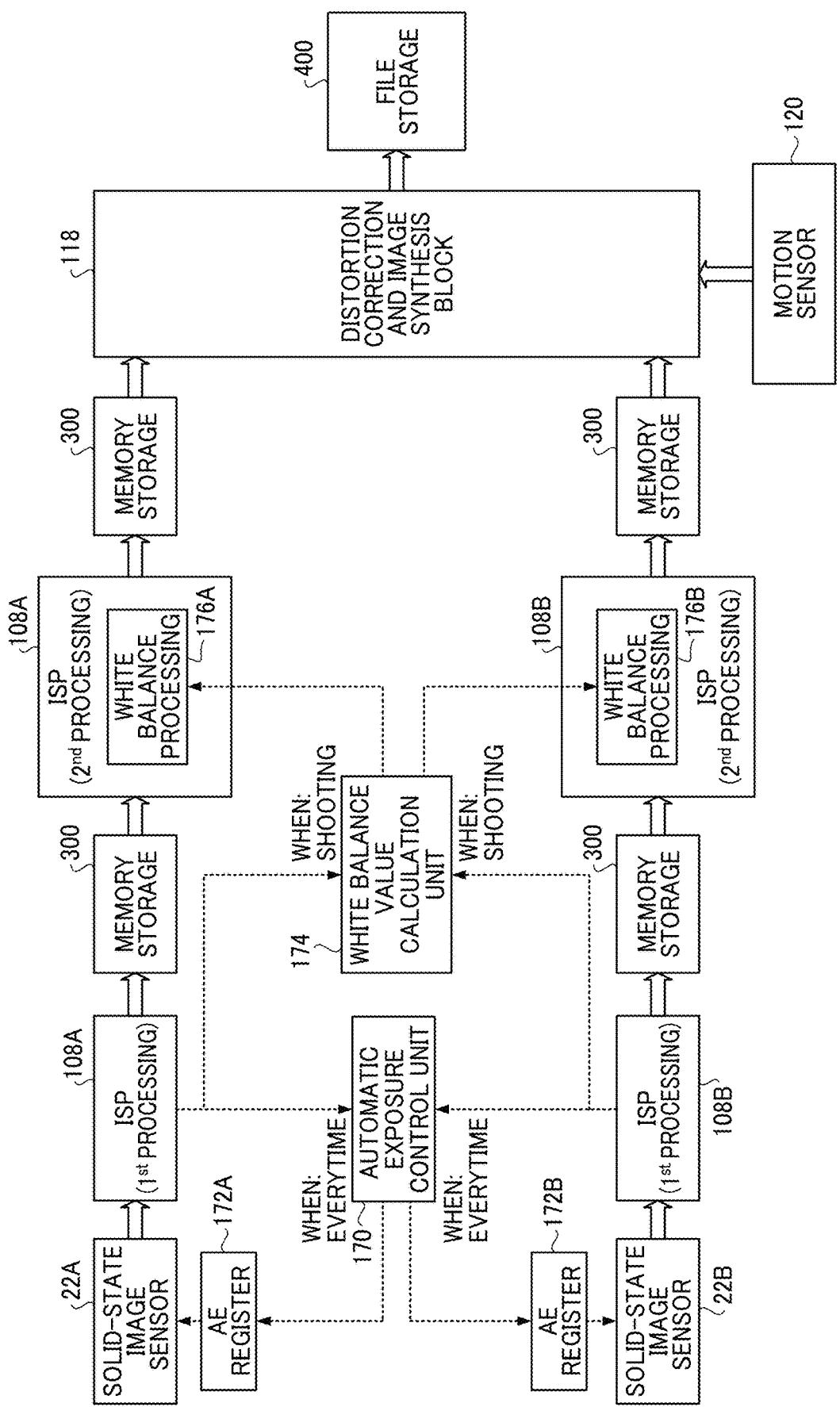
FIG. 5 is a flow chart of an image processing of the omnidirectional imaging device 10.

FIG. 5 illustrates a flow chart of an entire image processing performed by omnidirectional imaging device 10. As illustrated in FIG. 5, the solid-state image sensors 22A and 22B capture images under a certain exposure condition and output them. Then, the ISPs 108A and 108B perform a first image signal processing on the images from the solid-state image sensors 22A and 22B. As the first image signal processing, any of optical black (OB) correcting processing, defective pixel correction processing, Linear correcting processing, shading correcting processing, and area division average processing are performed, and the results of the first image signal processing are stored in the memory 300.

The area division average processing is processing for dividing an image area included in the captured image into a plurality of areas and calculating an integration value (or integration average value) of luminance for each divided area. The results of this processing are used in the AE control processing.

After the first image signal processing (ISP1) the ISPs 108A and 108B further perform a second image signal processing to the images and the images are stored in the memory 300. The ISPs 108A and 108B perform any of white balance 176, Bayer interpolation, color correction, gamma ($\gamma$) correction, YUV conversion and edge enhancement (Y CF LT) as the second image signal processing.

A color filter of one of colors of red (R), green (G), and a blue (B) is attached on a photodiode on each of the solid-state image sensors 22A and 22B. The color filter accumulates a light amount from an object. Since the amount of light to be transmitted varies according to the color of the filter, an amount of charges accumulated in the photodiode varies. The color having the highest sensitivity is G, and the sensitivity of R and B is lower than and about half of the sensitivity of G. In the white balance (WB) processing 176, processing for applying gains to R and B is performed to compensate the differences in the sensitivity and to enhance whiteness of the white in the captured image. Furthermore, since a color of an object changes according to a light source color (for example, sunlight and fluorescent light), a function is provided for changing and controlling the gains of R and B so as to enhance whiteness of the white even when the light source is changed. The parameter of the white balance processing is calculated based on integration value (or accumulation average value) data of RGB for each divided area calculated by the area division average processing.

In the ISP 108A, relative to a Bayer RAW image output from the solid-state image sensor 22A, the first image signal processing is performed. The image is stored in the memory 300. In the ISP 108B, similarly, relative to a Bayer RAW image output from the solid-state image sensor 22B, the second image signal processing is performed. The image is stored in the memory 300.

An automatic exposure control unit 170 performs processing to set the exposure of each of the solid-state image sensor 22A and the solid-state image sensor 22B is set to a proper exposure by using an area integrated value obtained by the area division average processing so that the brightness at the image boundary portion of the two images are similar to each other. (it means compound-eye AE). Each of the solid-state image sensors 22A and 22B may has an independent simple AE processing function, and each of the solid-state image sensor 22A and the solid-state image sensor 22B can independently set a proper exposure. In a case where change in an exposure condition of each of the sensors A and B is reduced and the exposure condition is stable, a process shifts to compound-eye AE control for two images from both solid-state image sensors. The automatic exposure control unit 170 may be executed on one ISP 108 or the automatic exposure control unit 170 may be distributed mounted on both ISPs 108A and 108B and exchanges information with each other while considering the information of the other ISP, and the exposure condition parameter of the own solid-state image sensor 22 may be determined.

As the exposure condition parameters, shutter speed, ISO sensitivity, and aperture value and the like can be used, but the aperture value may be fixed value. In compound-eye AE, by setting the shutter speeds of the solid-state image sensor 22A and 22B to be the same, a moving object across the solid-state image sensors 22A and 22B can be satisfactorily connected. The exposure condition parameters for the solid-state image sensors 22A and 22B are set from the automatic exposure control unit 170 to AE registers 172A and 172B of the solid-state image sensors 22A and 22B.

With respect to the solid-state image sensor 22A, of which the first image signal processing has been performed, the second image signal processing including a white balance processing 176A is performed. The processed data is stored in the memory 300. Similarly, with respect to the solid-state image sensor 22B, of which the first image signal processing has been performed, the second image signal processing including a white balance processing 176B is performed. The processed data is stored in the memory 300. Based on the integration value data of RGB for each divided area calculated by the area dividing average process, the white balance value calculation unit 174 calculates the parameters of the white balance processing in each of the solid-state image sensors 22A and 22B.

The image data after the second image signal processing is sent to the distortion correction and image synthesis block 118 and the distortion correction and image synthesis block 118 performs the distortion correction/synthesizing operation and an omnidirectional image is generated. Then, based on the information received from the motion sensor 120, the distortion correction/synthesizing operation performs vertical correction representing inclination correction. When the image is a still image, for example, the image is appropriately JPEG compressed in the still-image compression block 134 shown in FIG. 3, and the data is stored in the memory 300, and a file is stored (tagging). When the image is a moving image, for example, the image is appropriately converted into a moving image format such as MPEG-4 AVC/H.264 at the moving-image compression block 136 shown in FIG. 3, and the data is stored in the memory 300, and a file is stored (tagging). In addition, the data may be stored in a medium such as an SD card. The data is transferred to the information processing device 50 as smartphone (mobile terminal and the like) using wireless LAN (Wi-Fi), Bluetooth (registered trademark), and the like.

Figure 6B:
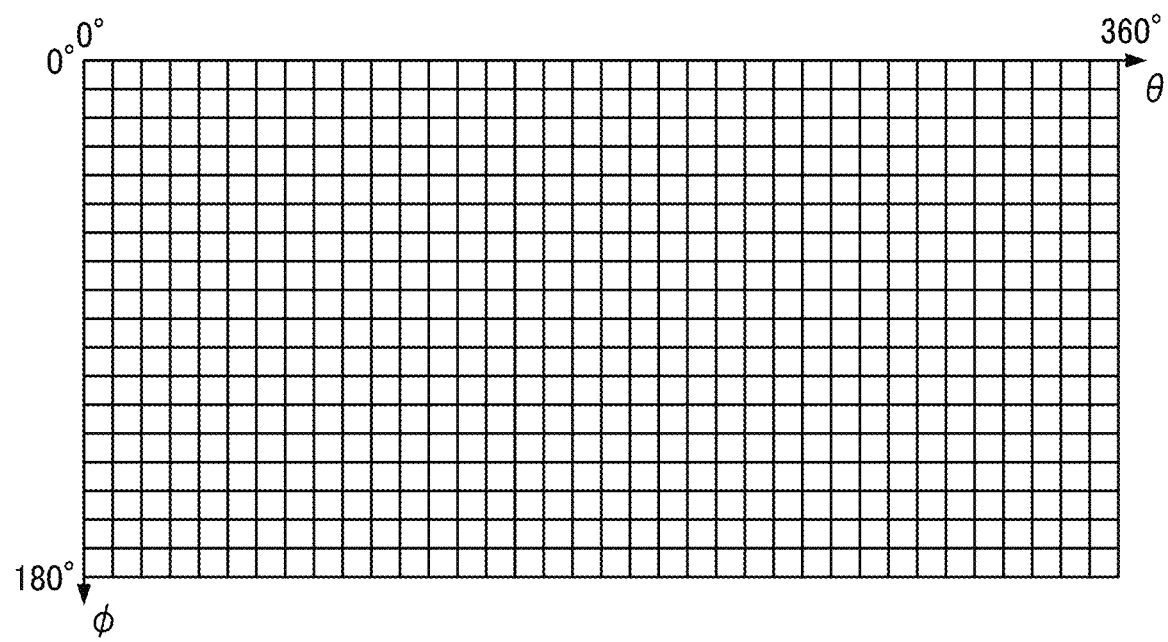
FIG. 6B illustrates a plane data structure of image data of an omnidirectional image.
Figure 6C:
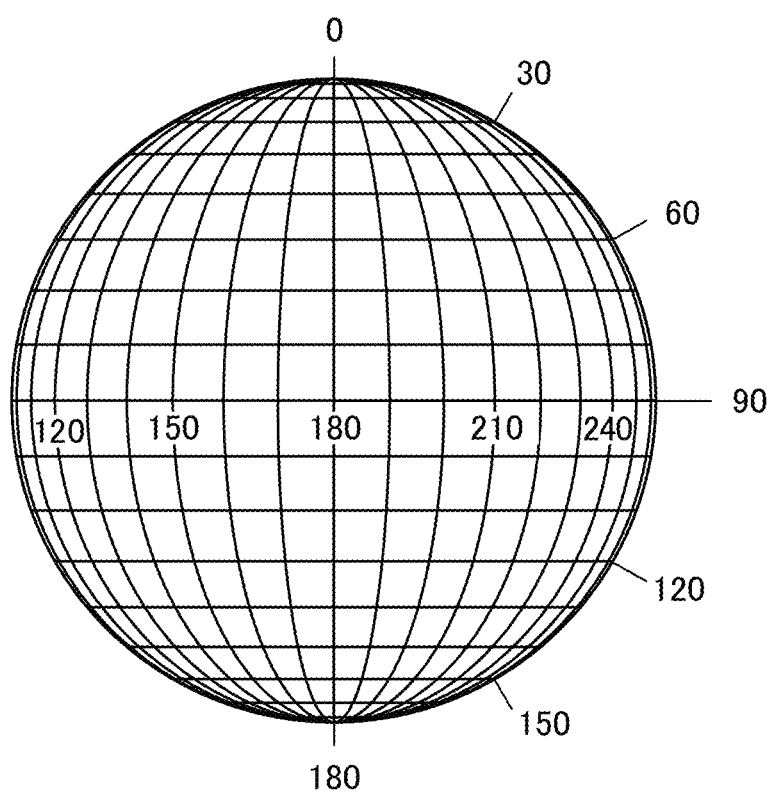
FIG. 6C illustrates a spherical data structure of image data of an omnidirectional image.

Hereinafter, a description relating to generation of an omnidirectional image and the generated omnidirectional image is provided with reference to FIGS. 6A-6C. FIG. 6A is an illustration of data structure of each image and the data flow of the image in generating an omnidirectional image.

First, images directly captured by each of the solid-state image sensors 22A and 22B roughly cover a hemisphere of the whole sphere as a field of view. Light that passes through each lens system 20A/20B is focused on the light receiving area of the corresponding solid-state image sensor 22A/22B to form an image according to a predetermined projection system. The solid-state image sensor 22A/22B is a two-dimensional image sensor defining a planar area of the light receiving area. Accordingly, the image formed by the solid-state image sensor 22A/22B is image data represented by a plane coordinate system. Such a formed image is a typical fish-eye image that contains an image circle as a whole in which each captured area is projected, as illustrated in a partial image A and a partial image B in FIG. 6A.

A plurality of the partial images captured by the plurality of solid-state image sensors 22A and 22B is then subjected to distortion correction and synthesis processing to form an omnidirectional image (spherical image). In the synthesis processing, an omnidirectional image, which constitutes a complementary hemispherical portion, is generated from each planar partial image. Then, the images including the respective hemispherical portions are joined together by a stitching processing by matching the overlapping areas of the hemispherical portions, and the omnidirectional images are synthesized to generate a full omnidirectional image including a whole sphere. The images of the respective hemispherical portions includes overlapping areas, but in the synthesis process the overlapping areas are blended to look the joint naturally between the two images FIG. 6B is an illustration of a plane data structure of the image data of an omnidirectional image and FIG. 6C is an illustration of a spherical data structure of the image data of an omnidirectional image.

As illustrated FIG. 6B, the image data in the omnidirectional image is represented by an array of pixel values having coordinates of a vertical angle $\varphi$ that corresponds to an angle relative to a predetermined axis, and a horizontal angle $\theta$ that corresponds to a rotation angle around the axis. The horizontal angle $\theta$ is represented in the range of 0 to 360 degree (or −180 degree to +180 degree), and the vertical angle $\varphi$ is represented in the range of 0 to 180 degree (or −90 degree to +90 degree).

As illustrated in FIG. 66C, every pair of coordinates values $(\theta, \varphi)$ on an omnidirectional image format is associated with a point on the spherical surface representing omni-azimuth having the imaging point as the center, and the omni-azimuth is mapped onto the entire celestial sphere image. The relationship between plane coordinates of an image captured by the fisheye lens, and coordinates on the spherical surface in the entire celestial sphere image can be associated with each other using a predetermined conversion table. The conversion table is generated beforehand at a manufacturer or the like, based on design data or the like of the respective lens optical systems, and following a predetermined projection model, and the data is used for converting a partial image into an omnidirectional image.

In the description of FIG. 6A, the partial image A captured by the lens A is on the center and the partial image B captured by the lens B is separated and arranged on the left and right. However, as will be described later, the partial image A may be on the left side and the partial image B may be arranged on the right side.

The following describes the zenith correction and the rotation correction using information from the motion sensor 120 with reference to FIGS. 7A, 7B and 8A-8D.

Figure 7A:
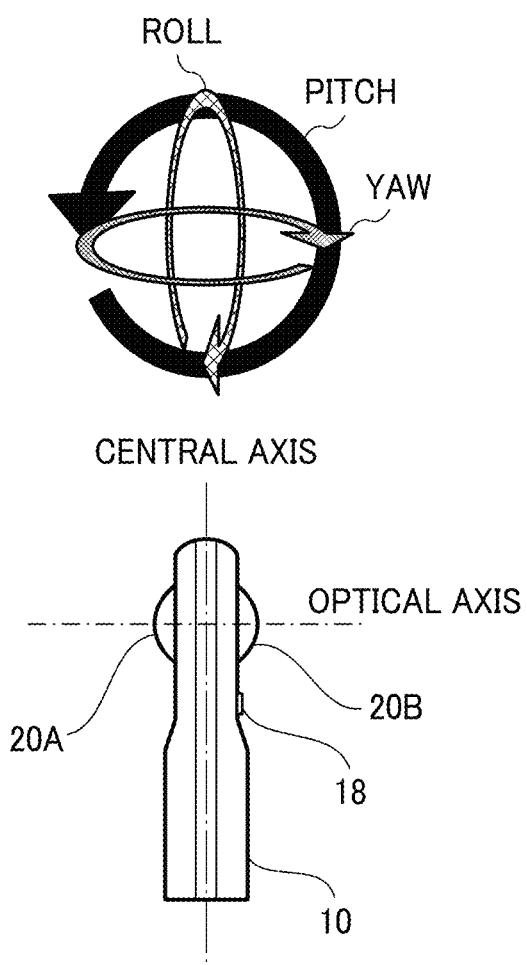
FIG. 7A is a diagram illustrating a definition of attitude viewed from a side of the omnidirectional imaging device 10.
Figure 7B:
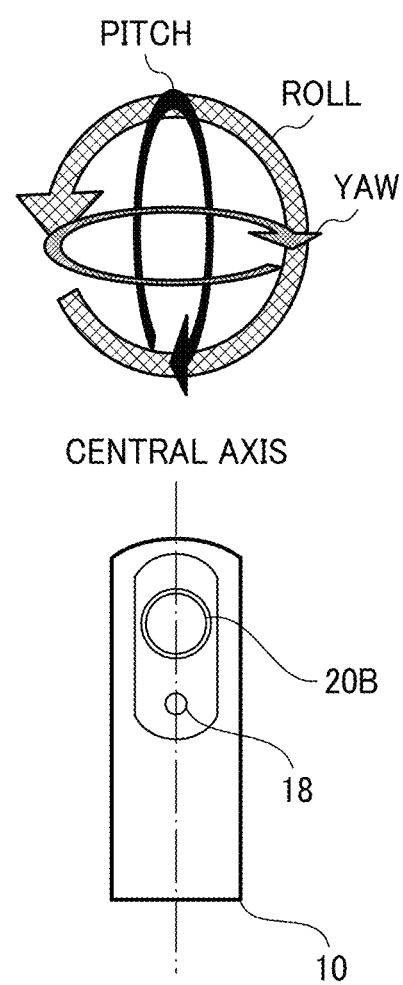
FIG. 7B is a diagram illustrating a definition of attitude viewed from a front of the omnidirectional imaging device 10.

FIG. 7A shows the definition of the attitude viewed from the side of the omnidirectional imaging device 10, and FIG. 7B shows the definition of the attitude viewed from the front of the omnidirectional imaging device 10.

As shown in FIGS. 7A and 7B, device angle of the omnidirectional imaging device 10 are defined as roll, pitch and yaw. As the optical axis direction passing through the center of the two lenses of the omnidirectional imaging device 10 is as the front-rear direction, a rotation angle (roll) is an angle around an axis and the front-rear direction of the omnidirectional imaging device 10, a rotation angle (pitch) is an angle around an axis about the left-right direction of the omnidirectional imaging device 10 and a rotation angle (yaw) is an angle around an axis about the top-bottom direction of the omnidirectional imaging device 10. A rotation that bows the omnidirectional imaging device 10 with one lens (for example, the lens opposite to the side where the shutter button 18 is located) as the front surface is represented by a pitch. A lateral rotation around the lens optical axis of the omnidirectional imaging device 10 is represented by a roll, and a rotation around the central axis of housing of the omnidirectional imaging device 10 is represented by a yaw.

In the implementation to be described, the front and rear of the omnidirectional imaging device 10 are defined for convenience as follows. That is, the lens system 20A on the side opposite to the shutter button 18 is a front lens, and the side photographed with the front lens is the front (F) side. In addition, the lens system 20B on the side where the shutter button 18 is provided is a rear lens, and the side photographed with the rear lens is a rear (R) side.

Figure 8A:
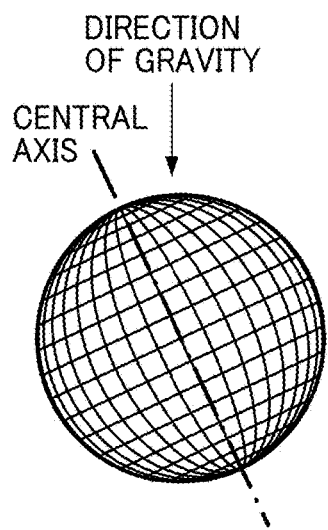
FIG. 8A is a diagram of a spherical data structure before a zenith and rotation correction.
Figure 8B:
FIG. 8B is the spherical data structure after the zenith and rotation correction.
Figure 8C:
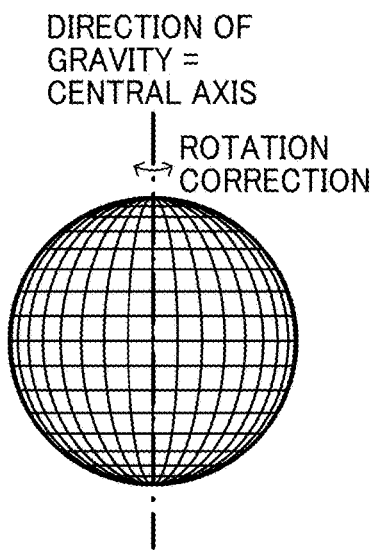
FIG. 8C is an omnidirectional image before the zenith and rotation correction.
Figure 8D:
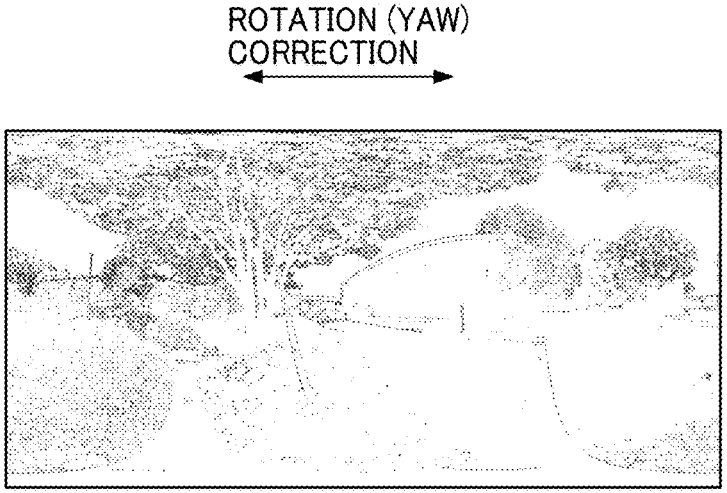
FIG. 8D is the omnidirectional image after the zenith and rotation correction.

FIGS. 8A-8D illustrate the zenith correction and the rotation correction applied to an omnidirectional image according to an implementation of the present application. In particular, FIG. 8A is a diagram of a spherical data structure before zenith and rotation correction and FIG. 8C is an omnidirectional image before the zenith and rotation correction. FIG. 8B is the spherical data structure after the zenith and rotation correction and FIG. 8D is the omnidirectional image after the zenith and rotation correction.

As described above, the image data of an omnidirectional image format is expressed as an array of pixel values where the vertical angle φ corresponding to the angle with reference to a certain axis z0 and the horizontal angle θ corresponding to the angle of rotation around the axis z0 are the coordinates. If no correction is made, the certain axis z0 is defined with reference to the omnidirectional imaging device 10. For example, the axis z0 is defined as the central axis z0, which defines the horizontal angle θ and the vertical angle φ, passing through the center of the housing 14 from the bottom to the top where the top is the imaging body 12 side and the bottom is the opposite side of the omnidirectional imaging device 10 in FIG. 2. Further, for example, the horizontal angle θ of an omnidirectional image is defined such that the direction of the optical axis of the optical element of one of the lens system 20A and 20B is positioned at the center of the corresponding solid-state image sensor 22 at the horizontal angle θ.

The zenith correction (correction in the direction of roll and the direction of pitch) is a correction processing that corrects the omnidirectional images (FIG. 8C) captured with the central axis actually inclined with respect to the direction of gravity as illustrated in FIG. 8A, to an omnidirectional image (FIG. 8D) captured with the central axis aligned with the direction of gravity as illustrated in FIG. 8B. The rotation correction is a correction (correction in the direction of yaw) that rotates around the direction of gravity in the omnidirectional image (FIG. 8D) to which the zenith correction has been made to have the central axis aligned with the direction of gravity. The rotation correction may not be performed, but is applied, for example, when the omnidirectional image is fixed in a specific direction. Additionally, in a moving image, the rotation correction is preferably used when correcting so that the first orientation is always at the center of the omnidirectional image, and when magnetic north is always at the center of the omnidirectional image.

In an exemplary flow of processing, a partial image is converted into an image including each hemispherical portion, and the obtained images are combined to generate an omnidirectional image, and the zenith and rotation processing (correction) is performed on the generated omnidirectional image. However, the order of the conversion process, the synthesis process, and the zenith and rotation process is not particularly limited.

Additionally, a synthesis process may be performed after zenith and rotation correction on each of partial image A and partial image B (and two omnidirectional images including complementary hemispherical parts converted from each partial image). And as a different example, in addition to rotating coordinate conversion for images in the omnidirectional image format, the conversion table for converting partial images to omnidirectional images reflects the effects of zenith and rotation correction, and based on the corrected conversion table, the corrected omnidirectional image can be directly obtained from the partial image A and the partial image B.

An example of an omnidirectional image displayed on a plane will be described.

Figure 9A:
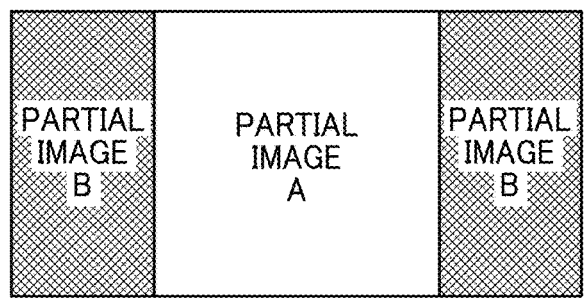
FIG. 9A is a diagram illustrating an arrangement of partial images of an omnidirectional image.
Figure 9B:
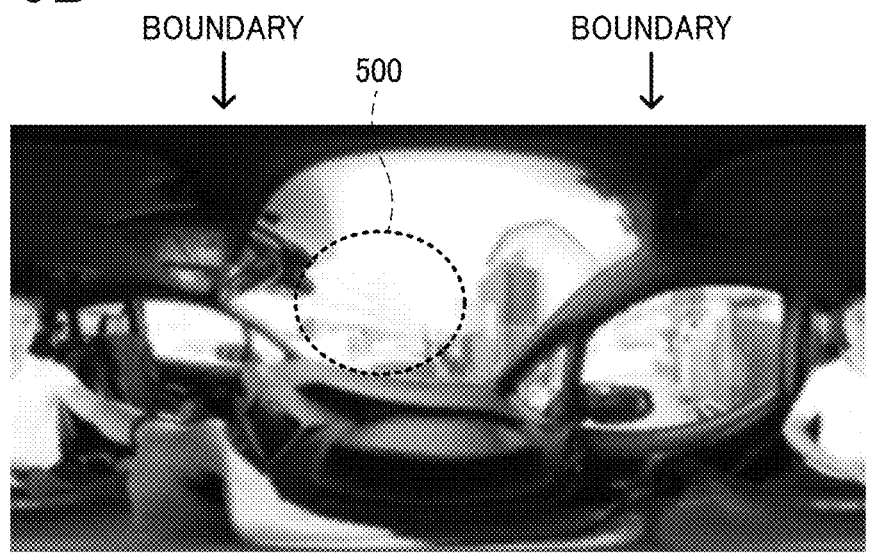
FIG. 9B is an omnidirectional image before application of a high dynamic range ("HDR") processing.
Figure 9C:
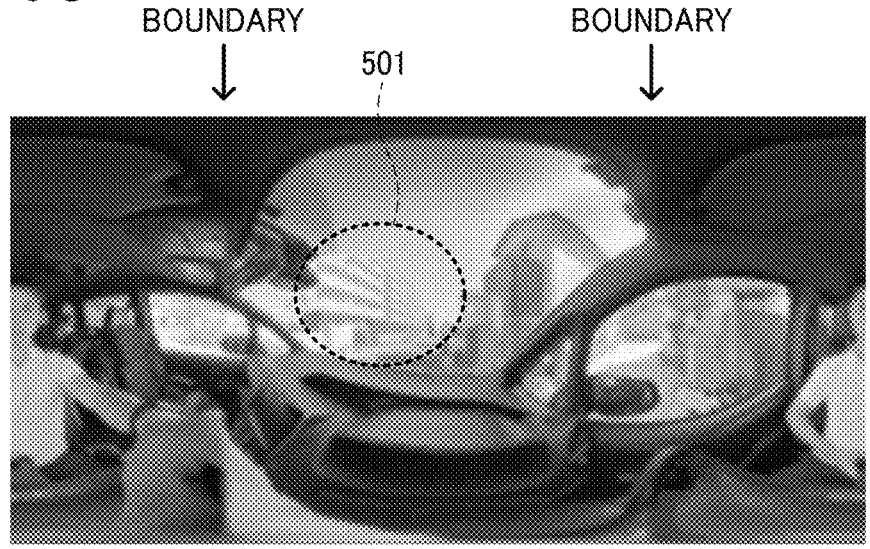
FIG. 9C is the omnidirectional image after application of the HDR processing.

FIGS. 9A-9C illustrate a specific example of an omnidirectional image having a difference in brightness according to an implementation of the present implementation. Here, there is an equirectangular as one of projection methods for displaying an omnidirectional image on a plane. The equirectangular is an image format in which the three-dimensional direction of each pixel of a spherical image is decomposed into latitude and longitude, and pixel values corresponding to a square lattice are arranged. By taking the earth as an example as illustrated in FIGS. 8C and 8D, when the equirectangular is projected so that the parallels and meridians intersect at right angles and at equal intervals.

FIG. 9A is an example showing the arrangement of the omnidirectional image. The arrangement of the omnidirectional image shows the partial image A captured by the solid-state image sensor 22A is arranged in the center, and the partial image B captured by the solid-state image sensor 22B is divided into two and arranged on the left and right of the partial image A.

FIG. 9B is an example of an omnidirectional image captured by the compound-eye AE control for the solid-state image sensors 22A and 22B. The partial image B in FIG. 9B is image with low brightness (darkness) overall, which is captured by the solid-state image sensor 22B mainly capturing in the vehicle. On the other hand, the partial image A in FIG. 9B is an image with high brightness (light) overall, which is captured by the solid-state image sensor 22A mainly capturing outdoor images. As described above, when the contrast of light and darkness in the image is large, when the image is taken by the compound-eye AE control, whiteout or blackout occurs in the image. For example, in FIG. 9B, a part of an outdoor building is whiteout like an area 500 indicated by a broken line, resulting in deterioration in image quality.

Here, as a method for improving the image quality when there is a large contrast in brightness in one image, there is a method of image capture ("shooting") with HDR processing. HDR processing can improve the image quality of an image by performing a process of combining a plurality of images shot with different exposures when there is a large difference in brightness in one image.

FIG. 9C shows an omnidirectional image captured by performing compound-eye AE control on the solid-state image sensors 22A and 22B and performing HDR processing. A scene in FIG. 9C is same scene as that shown in FIG. 9B, but the scene in FIG. 9C is shot with HDR processing. Therefore, the building in the area 501 indicated by the broken line in FIG. 9C is captured more clearly than that in FIG. 9B, and the image quality of the omnidirectional image is improved.

On the other hand, when shooting is performed by combining the compound-eye AE control and the HDR processing as shown in FIG. 9C, the image quality may be deteriorated if the subject is moving. Therefore, it is preferable that each of the solid-state image sensor is independently set to an appropriate exposure (independent AE control). That is, in the independent AE control, an imaging condition of the solid-state image sensor 22A is determined based on a photometric value obtained independently by the solid-state image sensor 22A, an imaging condition of the solid-state image sensor 22B is determined based on a photometric value obtained independently by the solid-state image sensor 22B. In particular, when the difference in brightness of the subject imaged by each solid-state image sensor is larger than a predetermined threshold, shooting is performed according to a shooting mode by independent AE control (hereinafter referred to as "brightness difference scene mode"), which is switched from a normal shooting mode by compound-eye AE control. Note that the "normal shooting mode" here refers to a shooting mode in which imaging conditions common to each solid-state image sensor are set by compound-eye AE control.

Figure 10:
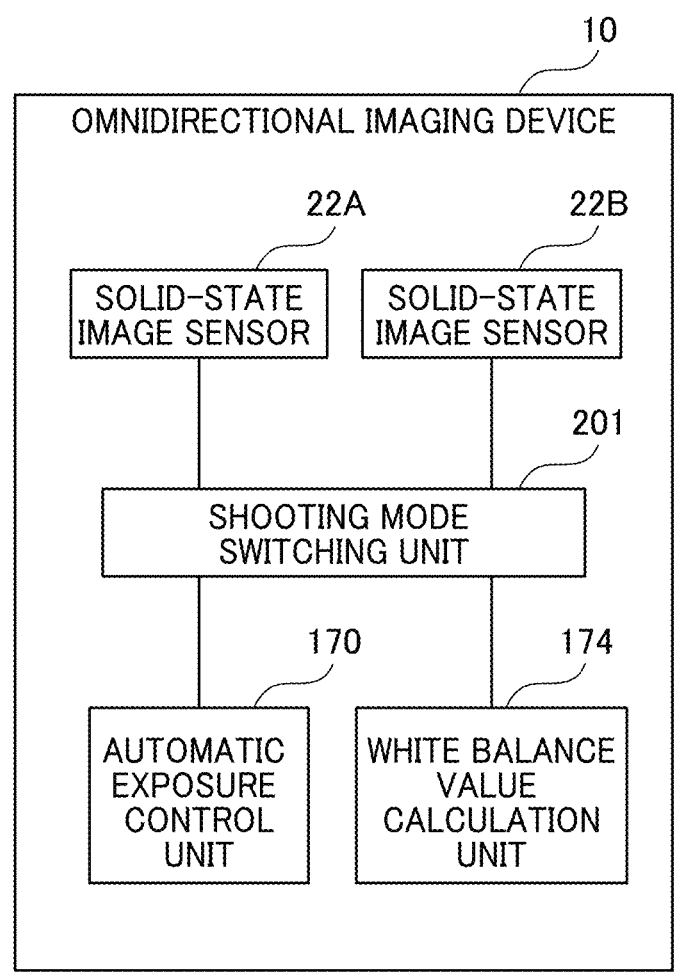
FIG. 10 is a diagram illustrating a functional configuration of the omnidirectional imaging device 10.

FIG. 10 is a diagram for illustrating a functional configuration of the omnidirectional imaging device 10. In an exemplary implementation, the processing circuitry of the omnidirectional imaging device 10 may be configured to perform the functions of shooting mode switching unit 201, automatic exposure control unit 170 and white balance value calculation unit 174.

The shooting mode switching unit 201 switches the normal shooting mode and the brightness difference scene mode. The shooting mode switching unit 201 switches the shooting mode based on the brightness between partial images obtained by the solid-state image sensors 22A and 22B.

When the brightness difference scene mode is selected, the automatic exposure control unit 170 sets imaging conditions for appropriate exposure for the solid-state image sensors 22A and 22B based on the photometric values obtained by the image sensors 22A and 22B. Noted that the acquisition of the photometric value is not necessarily performed by the solid-state image sensor 22, but may be performed by a photometric sensor or the like. In this case, the omnidirectional imaging device 10 comprises a photometric sensor corresponding to each solid-state image sensor 22A and 22B. That is, the omnidirectional imaging device 10 comprises a photometric sensor that measures a photometric value for setting the imaging condition of the solid-state image sensor 22A and a photometric sensor that measures a photometric value for setting the imaging condition of the solid-state image sensor 22B. The imaging conditions to be set can include various parameters such as shutter speed, ISO sensitivity, aperture value and the like.

Each shooting mode can be selected from manually operating applications of the omnidirectional imaging device 10 or the information processing device 50 by input of a user, but the implementation is not particularly limited those. For example, the shooting mode switching unit 201 may automatically switch to set the brightness difference scene when the omnidirectional imaging device 10 or the information processing device 50 compares the photometric values acquired by the solid-state image sensor 22 or the photometric sensor, and the difference is larger than a predetermined threshold value.

Similarly, in the brightness difference scene mode, a white balance value calculation unit 174 calculates the white balance value of each solid-state image sensor 22A and 22B based on the information acquired by each of the solid-state image sensors 22A and 22B at the shooting, and the white balance value calculation unit 174 performs white balance processing.

In addition, when switching from the normal shooting mode to the brightness difference scene mode, initial values of the imaging condition of each solid-state image sensor in brightness difference scene mode may be set to the image condition set in the normal shooting mode at the time of switching. Thereby, a convergence of the imaging condition by feedback control is accelerated.

Figure 11:
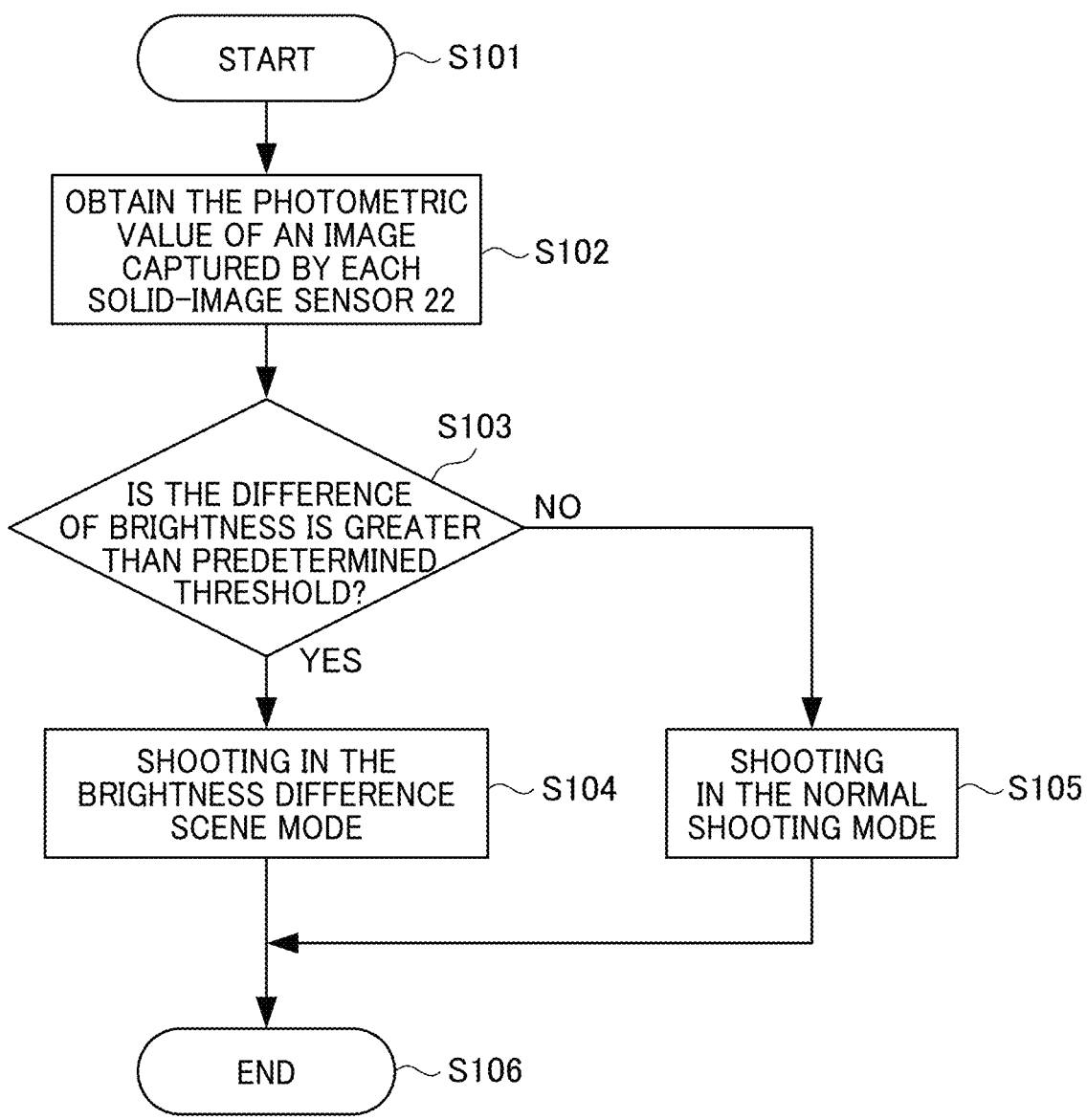
FIG. 11 illustrates a process performed by the omnidirectional imaging device 10.

Next, processing for selecting a shooting mode will be described with respect to the process performed by processing circuitry of the omnidirectional imaging device 10 and illustrated in FIG. 11. The omnidirectional imaging device 10 starts processing from step S101. In step S102, the shooting mode switching unit 201 acquires information on a brightness of an image captured by each of solid-state image sensors 22A and 22B.

In step S103, the shooting mode switching unit 201 calculates a brightness difference between the two images based on the information acquired in step S102. When the brightness difference is larger than the threshold (YES in S103), the shooting mode switching unit 201 determines to proceed to step S104, and the shooting mode switching unit 201 then selects the brightness difference scene mode for performing image capture by the omnidirectional imaging device 10. When the brightness difference is smaller than the threshold (NO in S103), the shooting mode switching unit 201 determines to proceed to step S105, and the shooting mode switching unit 201 selects the normal shooting mode for performing image capture by the omnidirectional imaging device 10. Thereafter, the process ends in step S106.

Figure 12A:
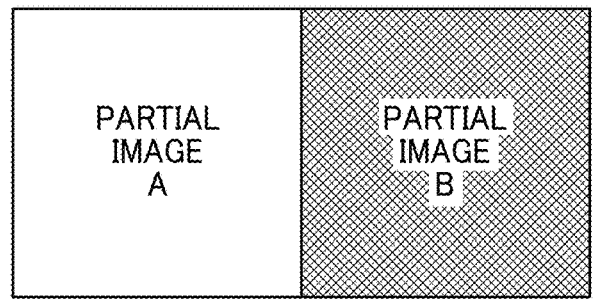
FIG. 12A is a diagram illustrating an arrangement of partial images of an omnidirectional image.
Figure 12B:
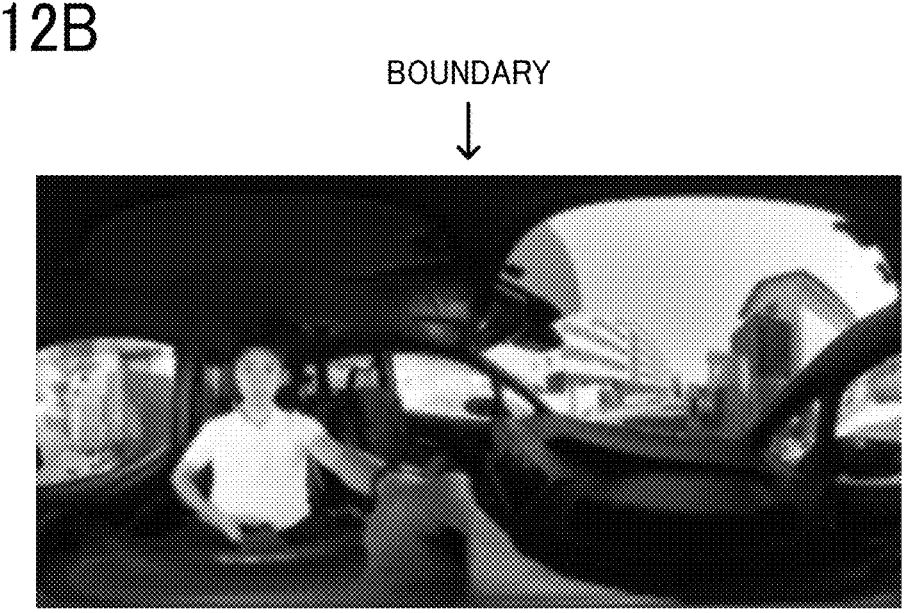
FIGS. 12B and 12C are exemplary omnidirectional images captured in a brightness difference scene mode.
Figure 12C:
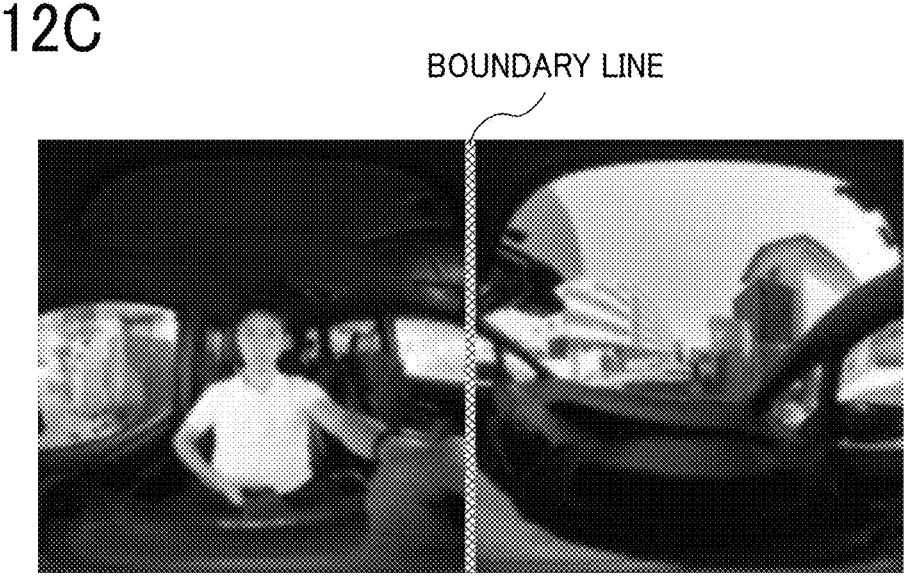

Next, an exemplary omnidirectional image captured in the brightness difference scene mode will be described. FIGS. 12A-12C is a diagram illustrating an example of an omnidirectional image captured in the brightness difference scene mode. When shot in the brightness difference scene mode, an omnidirectional image in which partial images are arranged side by side in one direction (hereinafter referred to as "horizontal parallel arrangement image") is preferably output as shown in FIG. 12A. FIG. 12A shows an example of an omnidirectional image in which the partial image A captured by the solid-state image sensor 22A is arranged on the left side and the partial image B captured by the solid-state image sensor 22B is arranged on the right side.

With such an arrangement, the entire image can be fit well. The number of boundary portions with a large difference in brightness can be reduced, an uncomfortable feeling that the user sees the image is reduced. Further, for a horizontally long omnidirectional image, by arranging the partial images side by side, the length of the boundary between the partial images can be set to the length of the short side direction of the omnidirectional image. That is, since the length of the boundary can be shortened, the uncomfortable feeling that the user sees the image is reduced.

FIG. 12B shows a specific example of the omnidirectional image captured in the brightness difference scene mode. By setting the imaging conditions of each image sensors 22 by independent AE control and shooting, overexposure and underexposure due to contrast are reduced. For example, even if one image sensor mainly shoots a person inside the vehicle, and the other image sensor mainly shoots landscapes of the outside of the vehicle, as shown in FIG. 12B.

In addition, in the case of an omnidirectional image captured in the brightness difference scene mode, the processor 100 may perform control to invalidate the connection position detection processing function of the distortion correction and image synthesis block 118, and may not perform the connection position detection processing for the overlapping areas of the partial images. Since the two partial images shot in the brightness difference scene mode have a large light/dark difference, joining them after the performing connection position detection processing makes the connected portions unnatural and causes a deterioration in image quality. Therefore, the omnidirectional image that looks more natural is generated by not performing the connection position detection process of partial images.

Further, when the contrast difference is particularly remarkable in the brightness difference scene mode, the processing circuitry of an omnidirectional imaging device 10 may perform a process to insert a boundary line at a boundary portion of a partial image at the time of outputting the horizontal parallel arrangement image as shown in FIG. 12C. For example, in FIG. 12C, the difference in the vicinity of the boundary is made inconspicuous by outputting the horizontal parallel arrangement image in which the boundary line is inserted. Thus, when the difference between partial images is remarkable, it can be made to recognize that the separate image is displayed side by side with respect for user. In addition, other images other than the boundary line may be inserted in the boundary portion of the partial image.

Further, when an omnidirectional image is output in the brightness difference scene mode, depending on the rotation direction of the device, the visibility may be impaired by performing a zenith correction. In particular, an orientation of the omnidirectional imaging device 10 may be considered when performing a zenith correction in order to yield a correct orientation of output images for better visibility of a user. For example, there may be a situation in which it is preferable not to perform the zenith correction for rotation in the pitch direction, but to perform zenith correction for rotation in the roll direction. FIGS. 13A-13C illustrate orientations of omnidirectional imaging device with respect to zenith correction of orientations of objects in captured omnidirectional images.

The left figure of FIG. 13A is a figure which shows a first example of capturing by the omnidirectional imaging device 10. An example of imaging is shown that the image sensor 22A shoot the car of the front side, and the image sensor 22B shoots the person of the rear side.

In the left diagram of FIG. 13A, the omnidirectional imaging device 10 does not rotate in any of the yaw direction, the roll direction, and the pitch direction, and performs imaging in an upright posture.

When imaged in the upright posture, the generated horizontal parallel arrangement image is an omnidirectional image as shown in the right figure of FIG. 13A. That is, the left partial image A of the omnidirectional image includes a car image, and the right partial image B includes a person image. In such a case, since the omnidirectional imaging device 10 is imaging in the upright posture, the zenith correction need not be performed.

The case is that the omnidirectional imaging device 10 is rotated in the roll direction and imaged. As shown in the left figure of FIG. 13B, when the omnidirectional imaging device 10 is rotated 90 degrees about the lens optical axis in the roll direction, each partial image of the horizontal parallel arrangement image is shown in the center of FIG. 13B.

FIG. 13B shows a subject (such as a person or a car) in the partial image rotates. When zenith correction is performed in the case, the horizontal parallel arrangement image as shown in the right figure of FIG. 13B can be generated to be similar to the right diagram of FIG. 13A. In such a case, since the subject such as a car or a person is located near the optical axis, the amount of distortion in the partial image is small. Therefore, even when distortion correction is performed along with zenith correction, the distortion of the subject is small and image quality is unlikely to deteriorate.

The case is that the omnidirectional imaging device 10 is rotated in the pitch direction and imaged. As shown in the left figure of FIG. 13C, when the omnidirectional imaging device 10 is rotated in the pitch direction and imaged so that the lens optical axis is directed in the vertical direction, the partial image A of the horizontal parallel arrangement image includes the upper part of the car and the person, and the partial image B includes the lower part of the car and the person as shown in the center of FIG. 13C.

When zenith correction is performed in the case, the omnidirectional image includes a car on the left side and a person on the right side as shown in the right figure of FIG. 13C. However, the zenith-corrected image as shown in FIG. 13C is not a horizontal parallel arrangement image, and the boundary of the partial image occurs in the direction along the long side of the image. Therefore, an unnatural image with a long boundary is obtained. In addition, if distortion correction is performed with zenith correction, subjects such as cars and people appear in positions away from the lens optical axis (near the edge of the partial image), so the amount of distortion increases and image quality decreases.

Therefore, it is preferable that the omnidirectional imaging system 1 of the present implementation performs a zenith correction for rotation in the roll direction and does not perform a zenith correction for rotation in the pitch direction. Note that rotation correction may or may not be performed for rotation in the yaw direction.

In the implementations described, the description has been made mainly using still images as examples, but the implementations are not particularly limited. Therefore, the implementation described for not only still images but also moving images may be applied.

As described above, according to the implementations, it is possible to provide an imaging device, an imaging system, a method, and a non-transitory computer readable medium storing executable instructions or a program for reducing a sense of discomfort of the omnidirectional image and improve the image quality regardless of the subject or the scene.

In the implementation described above, the omnidirectional imaging system 1 is described using the omnidirectional imaging device 10 and the omnidirectional imaging device 10 including the information processing device 50 communicating with the omnidirectional imaging device 10 as examples. However, the configuration of the omnidirectional imaging system 1 is not limited to the configuration described above. Therefore, not all the functional means described in the implementations are necessarily included in the omnidirectional imaging device 10. For example, in other implementations, the system of the above implementation may be realized by the cooperation between the omnidirectional imaging device 10 and the information processing device 50. In addition, the system of the above implementation may be an image processing system that processes an image captured by an external imaging unit.

The functions of the omnidirectional imaging system can be achieved by a computer-executable program written in legacy programming language such as assembler, C, C++, C#, JAVA(registered trademark) or object-oriented programming language. Such a program can be stored in a storage medium such as ROM, EEPROM, EPROM, flash memory, flexible disc, CD-ROM, CD-RW, DVD-ROM, DVD-RAM, DVD-RW, blue ray disc, SD card, or MO and distributed through an electric communication line. Further, a part or all of the above functions can be implemented on, for example, a programmable device (PD) as field programmable gate array (FPGA) or implemented as application specific integrated circuit (ASIC). To realize the functions on the PD, circuit configuration data as bit stream data and data written in HDL (hardware description language), VHDL (very high speed integrated circuits hardware description language), and Verilog-HDL stored in a storage medium can be distributed.

A non-transitory recording medium storing a computer-readable code for controlling a computer system to carry out an image processing method includes: acquiring a plurality of images and determining whether a difference in brightness between the plurality of images exceeds a predetermined threshold; in a case that the determining determines that the difference in brightness does not exceed the predetermined threshold, combining the plurality of images to generate an output image; and in a case that the determining determines that the difference in brightness exceeds the predetermined threshold, the method further includes arranging the plurality of images side by side in one direction to generate an output image.

Although the present application has been described in terms of exemplary implementations, it is not limited thereto. It should be appreciated that variations or modifications may be made in the implementations described by persons skilled in the art without departing from the scope of the present application as defined by the following claims.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An imaging device comprising:
   a plurality of image sensors configured to capture a plurality of images, and
   processing circuitry configured to:
   set an exposure condition when a brightness difference scene mode is selected by switching from a normal shooting mode, when a difference in brightness between the plurality of images exceeds a predetermined threshold;
   determine whether the difference in brightness between the plurality of images exceeds a predetermined threshold using the exposure condition setting; and
   based on the determination that the difference in brightness exceeds the predetermined threshold, arrange the plurality of images side by side in one direction to be output as an output image.

2. The imaging device according to claim 1,
   wherein based on the determination that the difference in brightness exceeds the predetermined threshold, the processing circuitry is configured to perform zenith correction, around an optical axis of each of the image sensors, to correct a corresponding one of the plurality of images.

3. The imaging device according to claim 1,
   wherein based on the determination that the difference in brightness exceeds the predetermined threshold, the processing circuitry is configured to generate an output image having a boundary line between the plurality of images captured by the plurality of image sensors.

4. The imaging device according to claim 1,
   wherein each of the plurality of image sensors is configured to capture a wide-angle lens image or a fish-eye lens image, and
   wherein the processing circuitry is configured to generate the output image that is an omnidirectional image based on the wide-angle lens image or the fish-eye lens image.

5. The imaging device according to claim 1,
   wherein the plurality of image sensors includes a plurality of imaging optical systems, and
   wherein imaging surfaces of the plurality of imaging optical systems are disposed facing in opposite directions and optical axes of the imaging optical systems are matched.

6. An image processing system comprising:
   processing circuitry configured to:
   acquire a plurality of images captured by a plurality of image sensors;
   set an exposure condition when a brightness difference scene mode is selected by switching from a normal shooting mode, when a difference in brightness between the plurality of images exceeds a predetermined threshold;
   determine whether the difference in brightness between the plurality of images exceeds a predetermined threshold using the exposure condition setting; and
   based on the determination that the difference in brightness exceeds the predetermined threshold, arrange the plurality of images side by side in one direction to generate an output image.

7. An image processing method comprising:
   acquiring a plurality of images,
   setting an exposure condition when a brightness difference scene mode is selected by switching from a normal shooting mode, when a difference in brightness between the plurality of images exceeds a predetermined threshold, and
   determining whether the difference in brightness between the plurality of images exceeds a predetermined threshold using the exposure condition setting;
   wherein, in a case that the determining determines that the difference in brightness exceeds the predetermined threshold, the method further comprising arranging the plurality of images side by side in one direction to generate an output image.

8. The image processing method according to claim 7, further comprising:
   capturing the plurality of images with a plurality of image sensors.

9. The image processing system according to claim 6,
   wherein based on the determination that the difference in brightness exceeds the predetermined threshold, the processing circuitry is configured to perform zenith correction, around an optical axis of each of the image sensors, to correct a corresponding one of the plurality of images.

10. The image processing system according to claim 6,
    wherein based on the determination that the difference in brightness exceeds the predetermined threshold, the processing circuitry is configured to generate an output image having a boundary line between the plurality of images captured by the plurality of image sensors.

11. The image processing system according to claim 6,
    wherein each of the plurality of image sensors is configured to capture a wide-angle lens image or a fish-eye lens image, and
    wherein the processing circuitry is configured to generate the output image that is an omnidirectional image based on the wide-angle lens image or the fish-eye lens image.

12. The image processing system according to claim 6,
wherein the plurality of image sensors includes a plurality of imaging optical systems, and
wherein imaging surfaces of the plurality of imaging optical systems are disposed facing in opposite directions and optical axes of the imaging optical systems are matched.

13. The image processing method according to claim 7,
wherein based on the determining that the difference in brightness exceeds the predetermined threshold, performing zenith correction, around an optical axis of each of the image sensors, to correct a corresponding one of the plurality of images.

14. The image processing method according to claim 7,
wherein based on the determining that the difference in brightness exceeds the predetermined threshold, generating an output image having a boundary line between the plurality of images captured by the plurality of image sensors.

15. The image processing method according to claim 7,
wherein the acquiring the plurality of images acquires a wide-angle lens image or a fish-eye lens image, and
wherein the generating the output image performs generating the output image that is an omnidirectional image based on the wide-angle lens image or the fish-eye lens image.

16. The image processing method according to claim 7,
wherein the acquiring the plurality of images acquires the plurality of image sensors using a plurality of imaging optical systems, and
wherein imaging surfaces of the plurality of imaging optical systems are disposed facing in opposite directions and optical axes of the imaging optical systems are matched.

\* \* \* \* \*